(12) United States Patent
Oomori

(10) Patent No.: US 8,969,783 B2
(45) Date of Patent: Mar. 3, 2015

(54) OPTICAL RECEIVER HAVING POSITIVE FEEDBACK LOOP FROM PHOTOCURRENT TO BIAS FOR PHOTODIODE

(75) Inventor: Hirotaka Oomori, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 241 days.

(21) Appl. No.: 13/361,567

(22) Filed: Jan. 30, 2012

(65) Prior Publication Data

US 2012/0193519 A1    Aug. 2, 2012

(30) Foreign Application Priority Data

Feb. 1, 2011 (JP) ................. 2011-019997

(51) Int. Cl.
 *H01L 31/00* (2006.01)
 *G01J 1/44* (2006.01)
 *H04B 10/69* (2013.01)

(52) U.S. Cl.
 CPC .................. *H04B 10/6911* (2013.01)
 USPC .................. 250/214.1; 250/214 R

(58) Field of Classification Search
 CPC ..... H01L 31/0232; H01L 31/09; H01L 31/08; G01J 1/44; H01J 40/14; H03F 3/08; H03F 3/087; H03F 3/082; H03G 3/3084; H03G 3/32; H03G 3/34; G11C 5/147; G05F 3/205; H04B 1/1623
 USPC ....... 250/214.1, 214 R, 214 A; 327/514, 515, 327/524, 528, 530; 398/206
 See application file for complete search history.

(56) References Cited

U.S. PATENT DOCUMENTS

| | | | | |
|---|---|---|---|---|
| 4,479,052 A | * | 10/1984 | Suzuki | 250/214 R |
| 6,529,563 B1 | * | 3/2003 | Mosinskis et al. | 375/317 |
| 6,573,789 B2 | * | 6/2003 | Shapiro | 330/86 |
| 7,439,480 B2 | * | 10/2008 | Moran | 250/214 A |
| 8,901,475 B1 | * | 12/2014 | Joffe et al. | 250/214 R |
| 2003/0178552 A1 | * | 9/2003 | Hofmeister et al. | 250/214 R |
| 2005/0224697 A1 | * | 10/2005 | Nishiyama | 250/214 A |
| 2009/0202259 A1 | * | 8/2009 | Tourette | 398/202 |

FOREIGN PATENT DOCUMENTS

| | | |
|---|---|---|
| JP | 09-093203 | 4/1997 |
| JP | 2005-304022 A | 10/2005 |

OTHER PUBLICATIONS

Cole et al., "100GbE-Optical LAN Technologies," IEEE Applications and Practice, pp. 12-19 (Dec. 2007).
Notification of Reasons for Rejection in Japanese Patent Application No. 2011-019997, dated Nov. 11, 2014.

* cited by examiner

*Primary Examiner* — Georgia Y Epps
*Assistant Examiner* — Carolynn A Moore
(74) *Attorney, Agent, or Firm* — Venable LLP; Michael A. Sartori; F. Brock Riggs

(57) ABSTRACT

An optical receiver is disclosed, in which a PD is biased by a positive feedback loop with respect to the photocurrent generated thereby. The optical receiver includes the PD, a current mirror to reflect the photocurrent into a mirror current, a current detector to convert the mirror current into a voltage signal, and a bias source stabilized by the negative feedback loop by sensing the output voltage thereof superposed with the voltage signal output by the current detector. The PD, the current mirror, the current detector and the bias source comprises the positive feedback loop for the photocurrent.

7 Claims, 5 Drawing Sheets

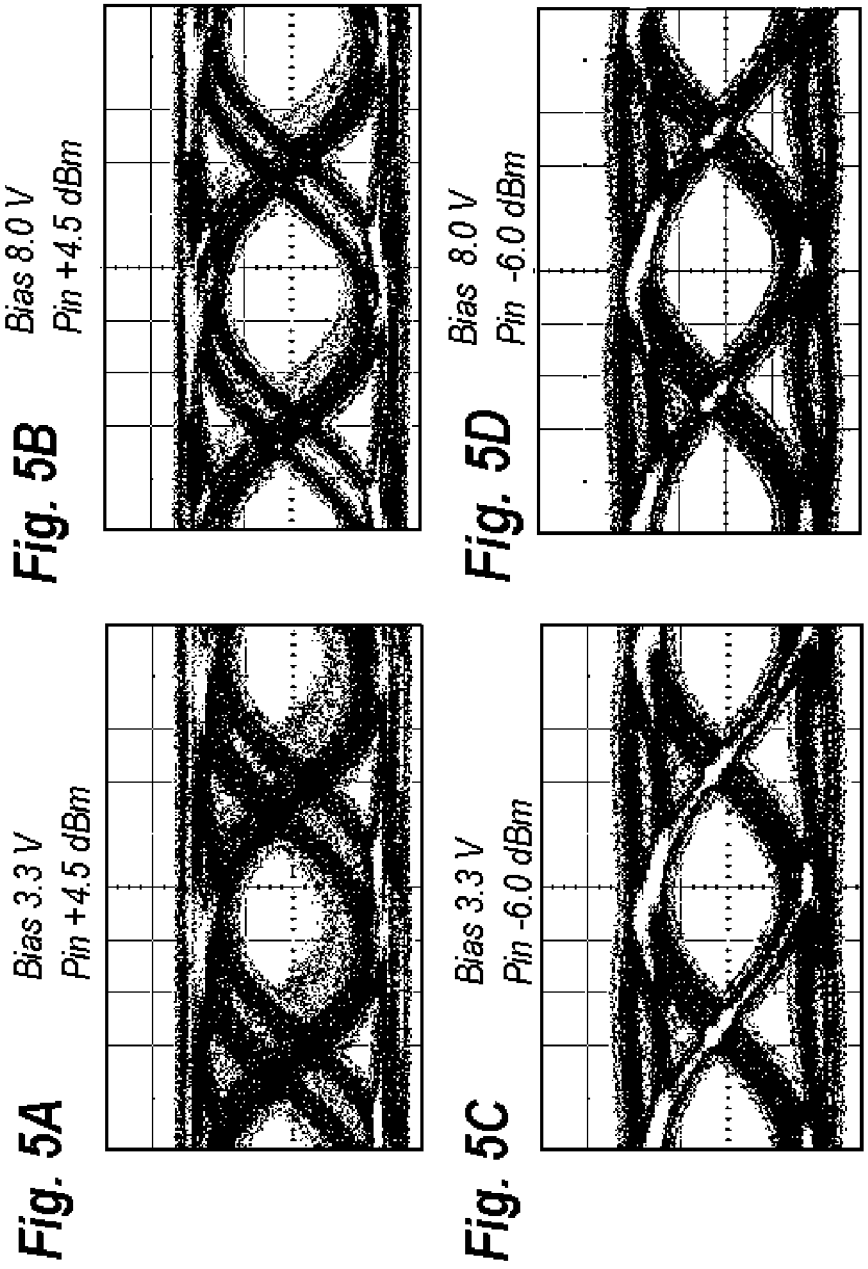

OPTICAL RECEIVER HAVING POSITIVE FEEDBACK LOOP FROM PHOTOCURRENT TO BIAS FOR PHOTODIODE

BACKGROUND OF THE INVENTION

1. Field of the Invention

The present invention relates to an optical receiver, in particular, the invention relates to an optical receiver having a variable bias source for a photodiode (hereafter denoted as PD).

2. Related Prior Arts

A publicly available document of, "100 GbE-Optical LAN Technology", published by IEEE Application and practice, December 2007, p.p 12-19 has introduced the specification of an optical transceiver applicable to the 100 Gb-EATHERNET (Trademark). Such a transceiver may realize the transmission speed of 100 Gbs by multiplexing four optical beams each having a specific wavelength different from others and a speed of 25 Gbps. The transceiver is necessary to install four transmitter optical subassemblies (hereafter denoted as TOSA) and four receiver optical subassemblies (hereafter denoted as ROSA).

The standard introduced therein has taken a condition into account where the TOSA may be implemented with a directly modulated laser diode (hereafter denoted as LD) in addition to an externally modulated LD operated as a type of so-called electro-absorption modulator. It becomes hard to operate the directly modulated LD in a speed of about 25 Gbps. An increased bias current may possibly operate the directly modulated LD but the optical output power emitted from the TOSA inevitably becomes large.

The standard also defines the condition for the ROSA, that is, the ROSA is necessary to recover an optical signal received thereby even when the ROSA receives an overloaded input, for instance, a magnitude of the input optical power exceeding 4.5 dBm. Assuming the transmission distance of about 10 km, the optical input power to the ROSA generally becomes about −6.0 dBm, which is far less than the overloaded optical input power. Then, when the PD implemented in the ROSA is set to receive such optical signal with power of about −6.0 dBm, the PD is also necessary to show enough tolerance for the overload optical input power.

However, the PD in the quality of the output electrical signal therefrom generally depends on the received input power. For instance, a jitter appearing in the electrical output of a PD often increases as the optical input power increase. The jitter causes a faint degradation in the transmission quality, for instance, the bit error rate, when the transmission speed is relatively slower; but the jitter shows fatal results in the communication system when the transmission speed reaches or exceeds 25 Gbps.

The invention of the present application relates to an optical receiver that comprises a PD, voltage source and a current detector. The PD generates a photocurrent depending on a bias applied thereto. The voltage source provides the bias. The current detector detects the photocurrent. A feature of the present optical receiver is that the current detector and the voltage source forms a positive feedback loop from the photocurrent to the bias, namely, the bias being increased as the increase of the photocurrent, but the loop gain of the feedback loop is set to be less than unity.

SUMMARY OF THE INVENTION

The optical receiver according to the present invention is applicable to a PD except for an avalanche photodiode, nor a type having a substantial carrier multiplication ratio, because the bias is positively fed back from the photocurrent.

The optical receiver may further include a current mirror put between the voltage source and the PD to reflect the photocurrent to a mirror current received and converted by the current detector. The voltage source may include a sensing amplifier and a voltage converter. The sensing amplifier may sense the bias. The voltage converter may generate the bias driven by the sensing amplifier. The current detector may vary a condition of the sensing amplifier such that the sensing amplifier senses lowered bias depending on the increase of the photocurrent, where the voltage source may operate to compensate this lowered condition by enhancing the bias. Accordingly, the current detector and the voltage source may comprise the positive feedback loop with respect to the photocurrent.

BRIEF DESCRIPTION OF THE DRAWINGS

The foregoing and other purposes, aspects and advantages will be better understood from the following detailed description of a preferred embodiment of the invention with reference to the drawings, in which:

FIGS. 5A to 5D compares output signals for conditions of the bias of 3.3V and 8.0 V, and the optical input of +4.5 dBm and −6.0 dBm.

DESCRIPTION OF PREFERRED EMBODIMENTS

Figure 1:
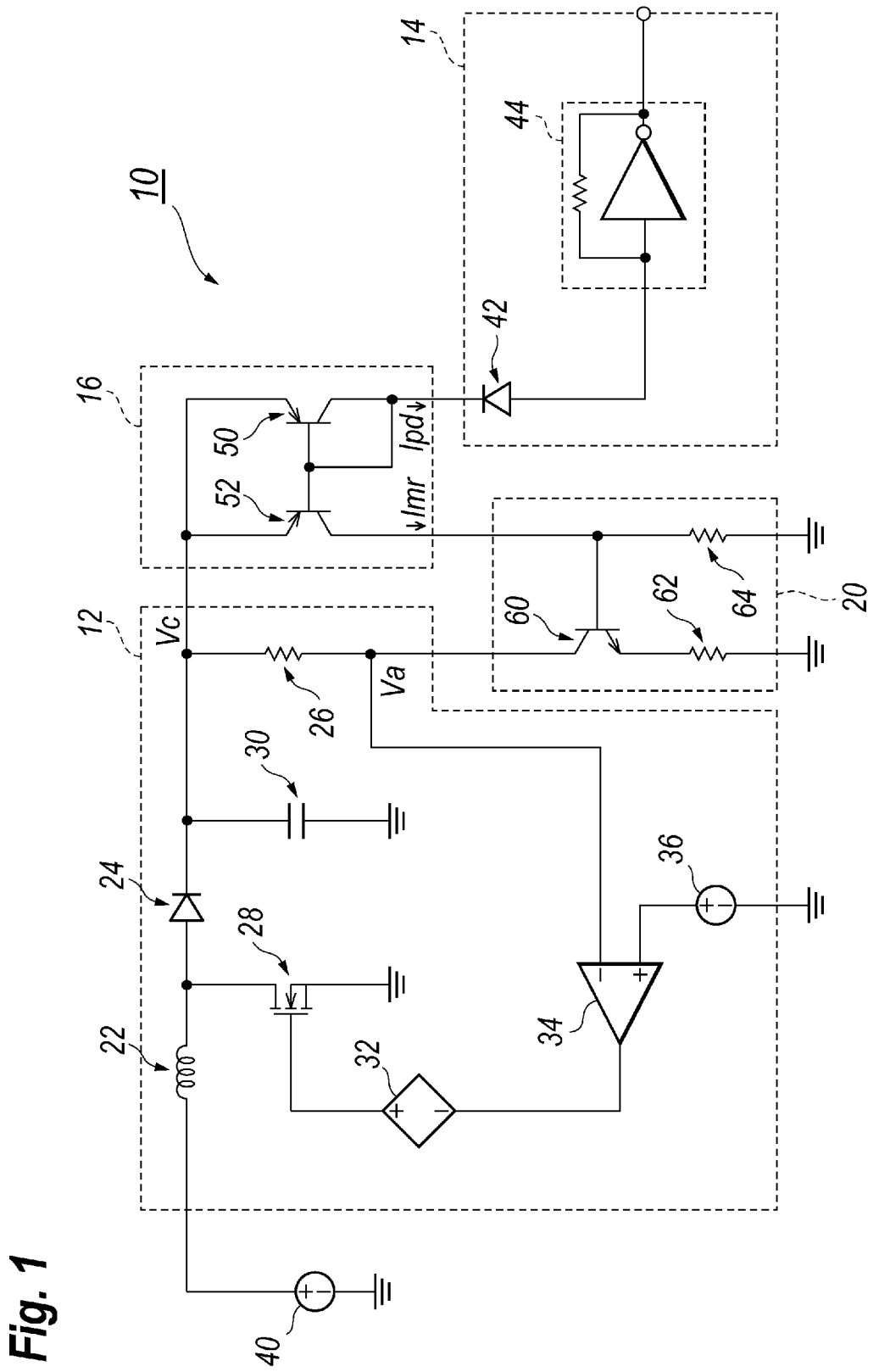
FIG. 1 is a circuit diagram of an optical receiver according to an embodiment of the present invention.

The degradation in the jitter at enhanced optical power may be suppressed by increasing a bias condition applied to the PD, as shown in FIGS. 5A to 5D; but the suppression of the jitter is not distinguishable until the bias to the PD becomes 8 V or more. The power supply externally applied to the optical transceiver is generally set to be 3.3 V or less. Accordingly, such a deep bias is necessary to be converted upwardly from the externally provided power supply by a DC-to-DC converter in the optical transceiver.

Commercially available DC-DC converters are generally less efficient when a difference between the output and input voltages thereof is large. It is inefficient to set the bias for PD in a higher condition assuming a large optical input level because such a condition rarely appears in a practical operation. An adjustable bias for the PD depending on the optical input level is a valuable means to cope the power consumption with the reception quality in the optical transceiver.

When an avalanche photodiode (APD) is used as a light-receiving device, where an APD in the multiplication factor thereof shows a strong dependence on the applied bias condition, an additional circuit is conventionally provided to vary the bias for the APD depending on the optical input level. However, such a circuit lowers the bias voltage when the optical input level to the APD increases to protect the APD from a self-breakdown by the multiplied carriers.

Next, one of embodiments of an optical receiver to suppress the degradation in the output signal thereof will be described as referring to accompanying drawings. The optical receiver 10 of FIG. 1 includes a voltage source 12, an opticalto-electrical converter (hereafter denoted as O/E-converter) 14, a current mirror 16, and a current detector 20.

The voltage source 12 is a DC-to-DC converter (hereafter DC/DC-converter) of the step-up type, and includes an inductor 22, a diode 24, a resistor 26, a switching transistor 28, a capacitor 30, a pulse width modulator (hereafter denoted as PWM) 32, a differential amplifier 34, and a reference generator 36. The inductor 22, which receives the voltage output of an external voltage source 40, is connected to the switching transistor 28 and the diode 24. The diode 24 in the cathode thereof, which is connected to the capacitor 30 and the resistor 26, may output the step-up voltage to the current mirror 16.

The transistor 28, which may be a power MOSFET, iterates the turn-on and the turn-off by receiving the modulated pulse signal output from the PWM 32. That is, the FET 28 turns on when the PWM 32 outputs a HIGH level of the pulsed signal, while the FET 28 turns off when the pulsed signal in a LOW level.

The inductor 22 may accumulate energy during a period when the MOSFET 28 turns on, and release the accumulated energy in addition to a voltage of the external source 40 in a period when the MOSFET 28 turns off. Thus, the diode 24 may rectify a signal applied to the anode thereof, which varies between the ground and the level higher than the voltage of the external source 40 by the energy accumulated in the inductor 22. The high level thus generated depends on a period of the HIGH level of the pulsed signal against the total pulse period, namely, the duty ratio of the pulsed signal coming from the PWM 32. The output voltage Vc rectified by the diode 24 may be supplied to the PD through the current mirror 16 as the reversed bias therefore.

The O/E converter 14 includes a PD 42 as an optical-to-electrical converting device and a trans-impedance amplifier (hereafter denoted as TIA) 44. The PD 42 may be a PIN-PD. The cathode of the PD 42 is biased by the output Vc of the voltage source 12 through the current mirror 16, while the anode thereof is coupled with the input of the TIA 44. The TIA 44 may convert a photocurrent Ipd generated by the PD 42 into a voltage signal. This voltage signal is provided to, for example, a clock recovery unit, a data recovery unit, and so on.

In the optical receiver 10, the current mirror 16 put between the voltage source 12 and the PD 42 may reflect the photocurrent Ipd generated by the PD 42 in a mirror current Imr flowing in the resistor 64. That is, assuming the sizes of respective transistors, 50 and 52, are equal, the photocurrent Ipd may be fully reflected in the mirror current Imr. When the size of the mirror transistor 52 is larger than that of the source transistor 50, the mirror current Imr may be multiplied by the ratio of the sizes of respective transistors, 50 and 52.

The current detector 20, which includes a transistor 60, a resistor 64, and an emitter resistor 62, may convert the mirror current Imr into a voltage signal with a phase opposite to the mirror current Imr. That is, the mirror current Imr causes a voltage drop in the resistor 64 and the transistor 60, which has an emitter grounded arrangement, amplifies this voltage drop with a voltage gain substantially determined by the ratio in the resistance of two resistors, 26 and 62. Thus, the voltage drop caused by the resistor 64 is reversely amplified by the transistor 60, that is, the collector output of the transistor 60 decreases in the voltage level as increasing the voltage drop by the resistor 64.

The sensing amplifier 34 may amplify a difference between this output of the transistor 60 and the output of the reference generator 36. When the difference increases, that is, the collector output of the transistor 60 decreases, the output of the sensing amplifier 34 increases, which increases the duty ratio of the PWM 32 and enhances the output Vc of the voltage source 12.

The PWM 32 may generate a pulsed signal whose duty ratio depends on the DC input thereof coming from the sensing amplifier 34. That is, when the output of the sensing amplifier 34 increases, which means the collector level of the transistor 60 exceeds the reference level provided from the reference generator 36, the duty ratio of the pulse train output from the PWM 32 increases. The increase of the duty ratio results in a prolonged period of the duration during which the inductor 22 is energized and the enhanced drain level of the transistor 28 during a turning-off period of the transistor 28. Thus, the increase of the duty ratio in the PWM 32 enhances the output level Vc of the voltage source.

Accordingly, the optical receiver 10 shown in FIG. 1 increases the bias applied to the PD 42 as the input optical level increases, which may suppress the degradation of the quality appearing in the electrical output of the PD 42, in particular, the jitter inherently appearing in the output for a large optical input level may be enough suppressed. On the other hand, the bias applied to the PD 42 becomes smaller for smaller optical input level, and the enhanced efficiency of the voltage source 12 may be obtained. Moreover, the current mirror 16 put between the PD 42 and the voltage source 12 may follow the sudden change of the optical input level.

On the other hand, when the output Vc increases the voltage level thereof, which also increases the collector output of the transistor 60, the output of the sensing amplifier 34 decreases to lower the duty ratio of the PWM 32 and the output Vc of the voltage source 12 decreases. That is, the optical receiver 10 of the present invention provides dual feedback loop, one of which is comprised of the current mirror 16, the current detector 20, and the voltage source; while, the other is comprised only by the voltage source 12.

Thus, one of key features in the optical receiver 10, the former feedback loop is the positive feedback loop between the photocurrent and the bias, that is, the output voltage Vc of the voltage source 12 increases depending on the increase of the optical input level; while, in the latter feedback loop constituted only by the voltage source 12, the sensing amplifier 34 and the PWM 32 operate so as to compensate the output level Vc by the negative feedback loop.

Figure 2:
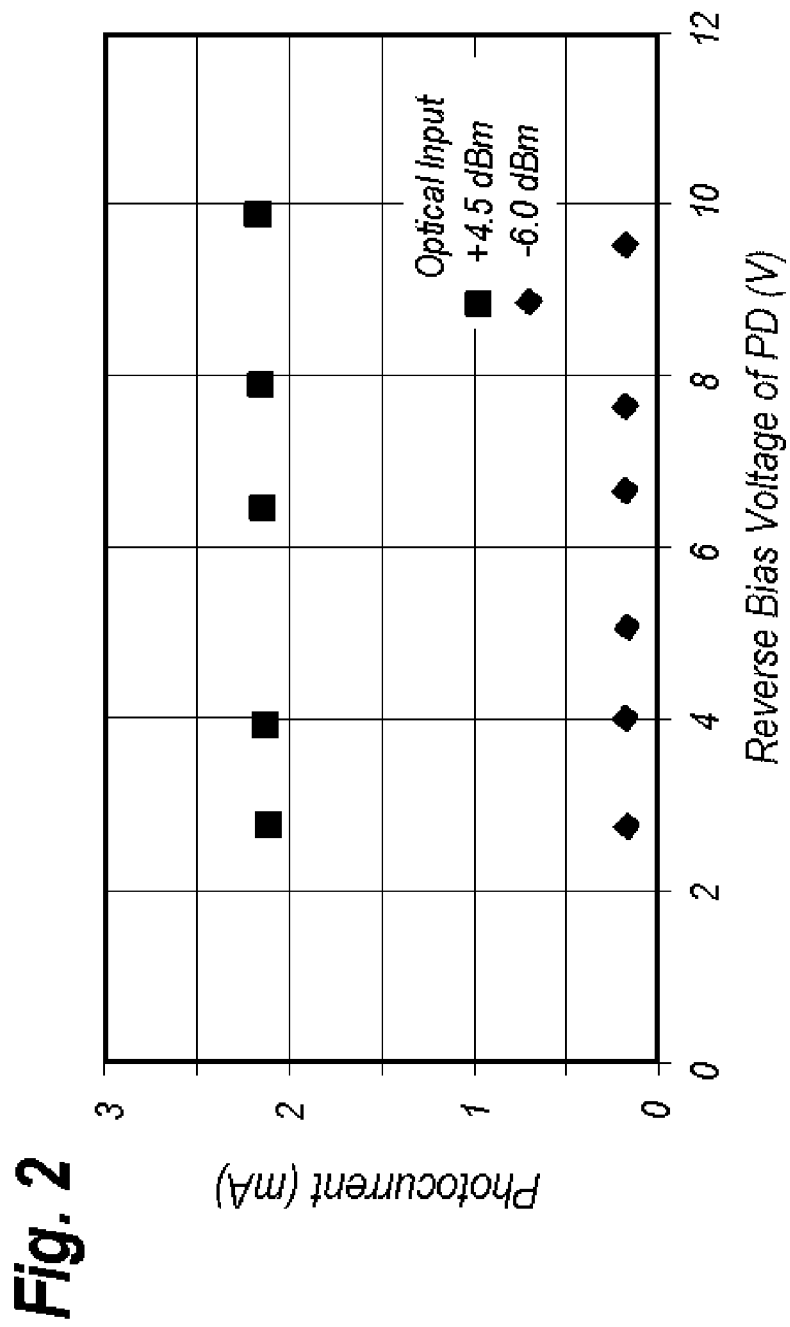
FIG. 2 shows behaviors of the photocurrent against the reverse bias applied to the PD for the optical input of +4.5 dBm and −6.0 dBm, respectively.

FIG. 2 shows dependence of the photocurrent Ipd on the bias applied to the PD 42 for two optical input levels of 4.5 dBm and −6 dBm, respectively. The first feedback loop including the current detector 20 is left inactive until the voltage drop of the resistor 64 caused by the mirror current Imr exceeds the forward saturation voltage of the pn-junction. Specifically, the mirror current Imr causes the voltage drop of $V_B$ (=Imr×$R_3$), where $V_B$ is the base level of the transistor 60 and $R_3$ is resistance of the resistor 64. The transistor 60 turns off until the base-emitter bias exceeds the forward saturation voltage of the pn-junction, which is about 0.75 V. Therefore, the first feedback loop is kept off until the mirror current Imr exceeds a level $0.75/R_3$.

Referring to FIG. 2, a behavior of the photocurrent against the bias voltage for the optical input level of −6 dBm shows substantially flat, namely, independent of the bias condition; which means that the photocurrent Ipd reflected in the mirror current Imr is less than the threshold $0.75/R_3$ described above. The other behavior in FIG. 2 corresponding to the optical input level of +4.5 dBm shows a gradual increase with respect to the bias condition, that is, the photocurrent Ipd slightly increases as the bias becomes deeper. This means that the first feedback loop including the current detector 20 becomes active but the loop gain thereof is kept small enough.

The first feedback loop is a positive feedback loop, that is, increasing the bias to the PD 42, the photocurrent Ipd increases and the output Vc of the voltage source 12 also increases so as to increase the photocurrent Ipd. However, the loop gain of this positive feedback loop is far less than unity (1); accordingly, the first feedback loop may be stably operable. One reason why the loop gain is far less than unity (1) is that the PD 42, which is the PIN-PD in the present embodiment, generally has dull dependence in the conversion efficiency on the bias condition. Therefore, the optical receiver 10 may be stably operable even in an enhanced optical input level and the bias condition becomes large. In a case where the optical receiver implements an APD as a light-receiving device, the feedback loop, to increase the bias in a greater optical input, sets the whole system in an unstable state because an APD shows strong dependence in the conversion efficiency thereof on the bias condition.

(First Modification)

Figure 3:
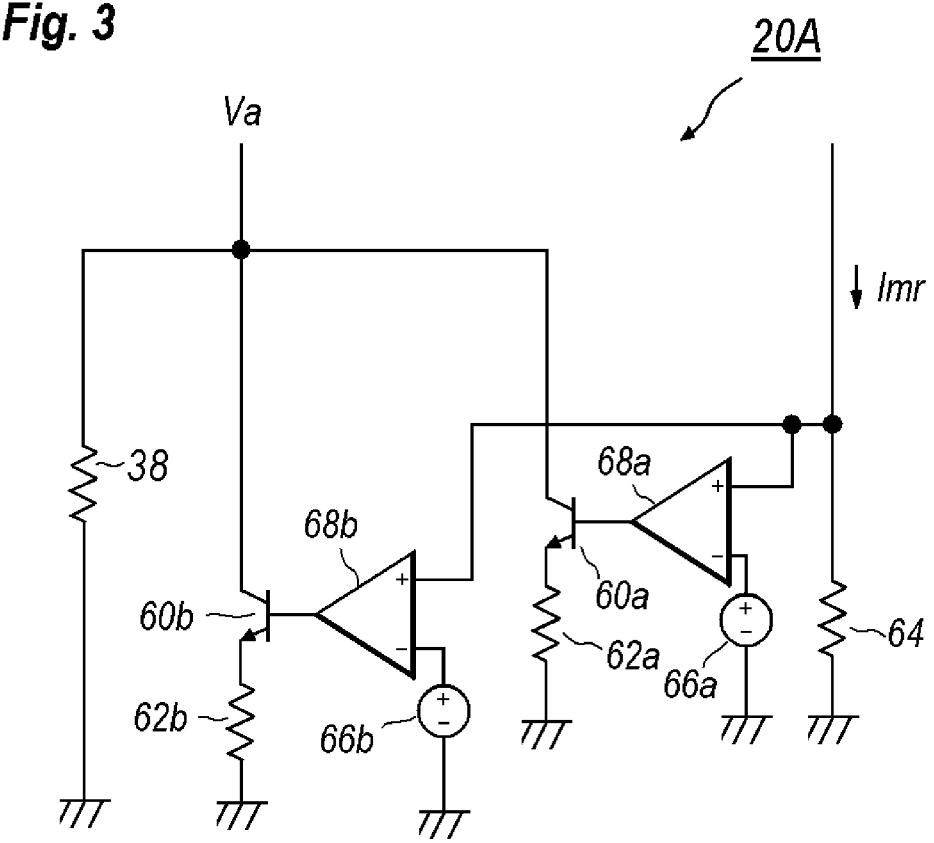
FIG. 3 is another circuit diagram of a current detector according to a modified embodiment of the invention.

FIG. 3 shows a modified current detector 20A. The arrangement shown in FIG. 1 has the possibility to set the positive loop gain from the photocurrent Ipd to the output Vc of the voltage source 12 in a state greater than unity when the photocurrent Ipd generated by the PD 42 strongly depends on the bias, or the sensitivity of the sensing amplifier 34 and/or that of the PWM 32 is large enough. In such a case, the optical receiver 10, or the voltage source 12 becomes unstable. A modified current detector 20A shown in FIG. 3 may avoid this instability of the positive feedback loop.

Specifically, the sensing unit to sense the output Vc of the voltage source 12 operates in the voltage mode, that is, the sensing amplifier 34 may sense a voltage divided by two resistors, 26 and 38. While, the current detector 20A includes a plurality of references, comparators, and transistors, where two units are provided in a modified embodiment shown in FIG. 3. Each of the comparators, 68a and 68b, receives the voltage signal generated by the resistor 64 and the mirror current Imr. The transistors, 60a and 60b, are connected in the base thereof to respective output of the comparators, 68a and 68b, and the collector thereof is commonly connected to the input of the sensing amplifier 34.

When the optical input level is small, a voltage drop caused in the resistor 64 by the mirror current is less than both references, 66a and 66b, which turns off both comparators, 68a and 68b, and emitter resistors, 62a and 62b, are isolated from the upper sensing resistor 26. The positive feedback loop causes no effect to the voltage source 12 and the output Vc may be kept constant independent of the optical input level.

By increasing the optical input level to enhance the voltage converted by the resistor 64 so as to exceed the reference 66a, the first comparator 68a may reverse the output thereof to turn on the first transistor 60a, which makes the lower sensing resistor equivalent to a parallel circuit formed of the resistor 38 and the first emitter resistor 62a. Because the lower sensing resistor decreases, compared with the former status, the output Vc increases to a voltage determined by the new sensing circuit of resistors, 26, 38, and 62a, which increases the output Vc to Vc' (>Vc).

By further increasing the optical input, the voltage generated by the resistor 64 also increases to exceed the second reference 66b. Then, two comparators, 68a and 68b, reverse the output thereof and two transistors, 60a and 60b, turn on, which makes the lower sensing resistor equal to be a parallel circuit of three resistors, 38, 62a, and 62b, the resistance formed thereby is less than those two cases mentioned above. The voltage source 12 may operate so as to compensate this reduction of the lower sensing resistor to keep the input of the sensing amplifier 34 in constant, then, the output Vc thereof further increases to Vc" (>Vc'>Vc).

Figure 4:
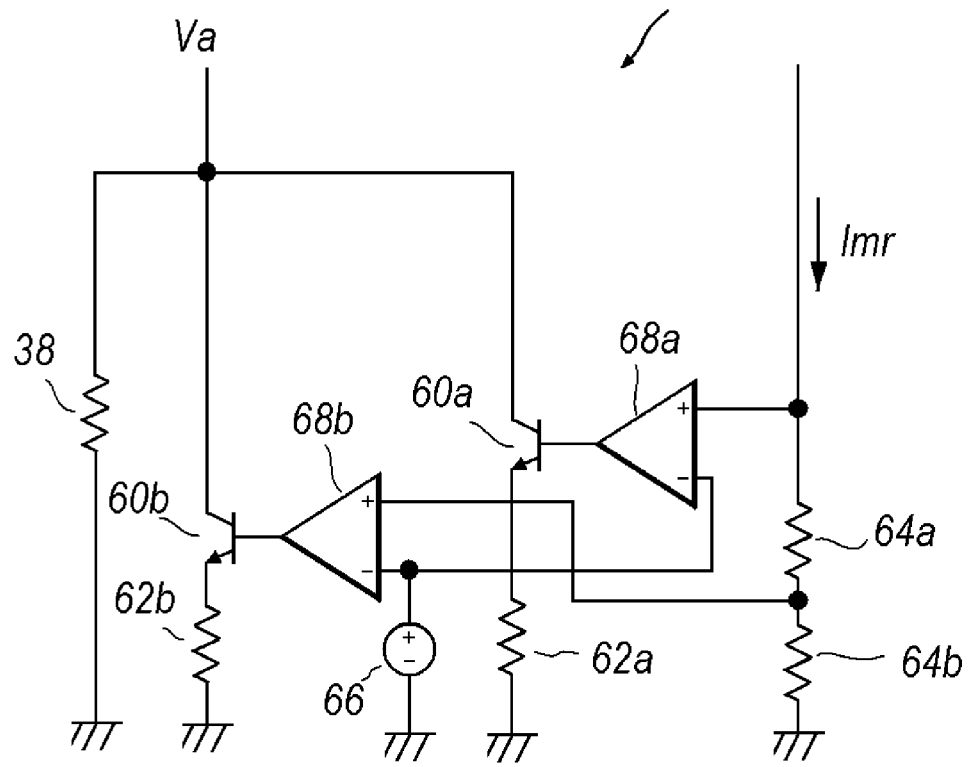
FIG. 4 is still another circuit of a current detector.

The modified current detector 20B shown in FIG. 4 may vary the output Vc of the voltage source 12 in stepwise to limit the maximum voltage to be Vc"; accordingly, even the PD 42 shows strong dependence of the photocurrent generated thereby on the bias, the bias applied to the PD may be limited to be less than Vc".

FIG. 4 shows still modified embodiment of the current detector 20B. The current detector shown in FIG. 4 divides the sensing resistor 64 into two parts, 64a and 64b, and provides only one reference 66. The voltage sensed by the first comparator 68a is greater than the voltage sensed by the second comparator 68b, the same operation of the current detector 20B described above may be obtained.

While several embodiments and variations of the present invention are described in detail herein, it should be apparent that the disclosure and teachings of the present invention suggest many alternative designs to those skilled in the art. For instance, the current mirror disclosed herein assumes the ratio of the mirror current against the photocurrent to be unity, but the mirror ratio may be optionally varied by setting the size of the transistors, 50 and 52, or inserting an emitter resistor with different resistance to each other between the emitter and the output of the voltage source 12. Accordingly, the appended claims are intended to encompass all such modifications and changes as fall within the true spirit and scope of this invention.

I claim:

1. An optical receiver, comprising:
   a photodiode to generate a photocurrent;
   a voltage source to provide a bias to the photodiode; and
   a current detector to detect the photocurrent,
   wherein the bias is controlled by a positive feedback loop having a loop gain less than unity, the positive feedback loop including the photodiode, the current detector and the voltage source.

2. The optical receiver of claim 1,
   wherein the photodiode is a type except for an avalanche photodiode.

3. The optical receiver of claim 1,
   further including a current mirror put between the photodiode and the voltage source to provide a mirror current that reflects the photocurrent to the current detector.

4. The optical receiver of claim 1,
   wherein the voltage source includes a sensing amplifier and a voltage converter forming a negative feedback loop to stabilize the bias, the sensing amplifier comparing the bias with a reference supplied to the sensing amplifier to generate a difference between the bias and the reference, the voltage converter generating the bias depending on the difference.

5. The optical receiver of claim 4,
   further including a current mirror put between the photodiode and the voltage source to provide a mirror current that reflects the photocurrent to the current converter,
   wherein the current detector includes a resistor and a transistor, the resistor flowing the mirror current therein to generate a voltage signal, the transistor amplifying the voltage signal, and
   wherein the voltage source further includes a load resistor connected to an output of the voltage source to provide the bias, the sensing amplifier senses the bias through the load resistor operated as a load of the transistor of the current detector, the load resistor and the transistor being connected in series between the output of the voltage source and a ground to form a voltage divider, the sensing amplifier sensing the bias through the voltage divider.

6. The optical receiver of claim 5,
wherein the transistor varies a dividing ratio of the divider depending on the voltage signal generated by the mirror current.

7. The optical receiver of claim 5,
wherein the transistor in the current detector is an n-type transistor, and
wherein the current detector further includes an emitter resistor connected to an emitter of the transistor, the voltage divider including the load resistor, the transistor, and the emitter resistor connected in series between the bias and the ground.

* * * * *